Aug. 26, 1969  T. G. KIRN  3,463,372
FILM PULL DOWN AND CONTROL MECHANISM FOR
A MOTION PICTURE PROJECTOR
Filed June 23, 1967
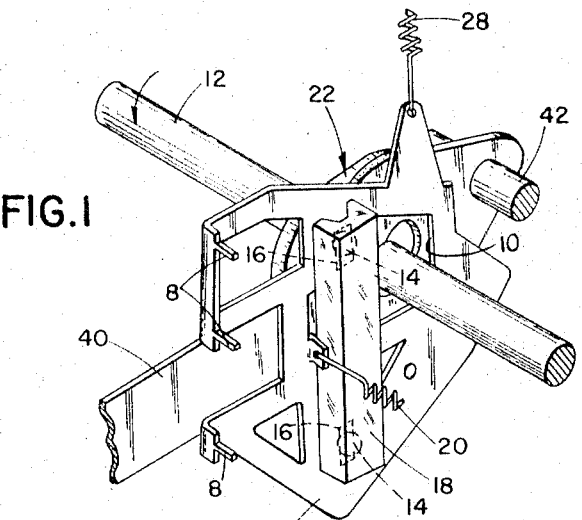
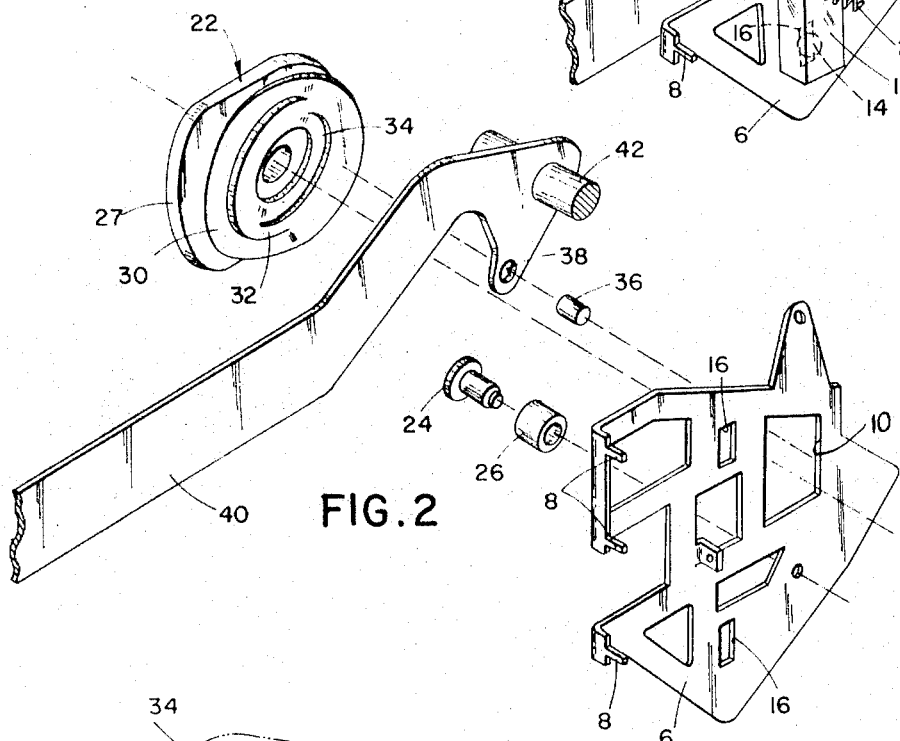
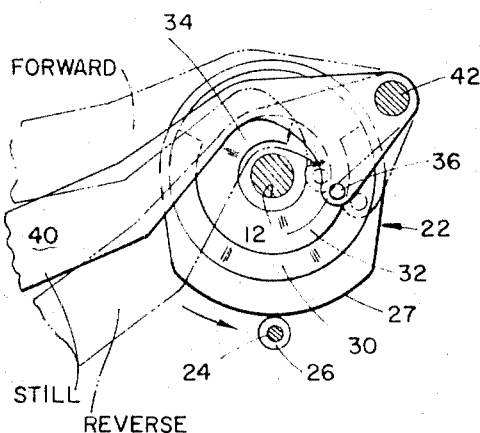
THOMAS G. KIRN
INVENTOR.
BY *Steve W. Greenbaum*
*Robert W. Hampton*
ATTORNEYS United States Patent Office 3,463,372
Patented Aug. 26, 1969

3,463,372
FILM PULL DOWN AND CONTROL MECHANISM
FOR A MOTION PICTURE PROJECTOR
Thomas G. Kirn, Rochester, N.Y., assignor to Eastman
Kodak Company, Rochester, N.Y., a corporation of
New Jersey
Filed June 23, 1967, Ser. No. 648,282
Int. Cl. B65h 17/40; G03b 1/22
U.S. Cl. 226—49                                    8 Claims

ABSTRACT OF THE DISCLOSURE

A film pull down and control mechanism comprising a unitary, unidirectional rotary cam and a pair of cam followers, one of which is movable relative to the cam by the control mechanism to provide "forward," "reverse" and "still" projection of the film.

BACKGROUND OF THE INVENTION

This invention relates generally to motion picture projectors, and more specifically to a film pull down and control mechanism for a motion picture projector for providing "forward," "reverse" and "still" projection of the film.

Film pull down and control mechanisms for motion picture projectors, for providng "forward," "reverse" and "single frame or still" projection of the film, are well known in the art. Such projectors of which applicant is aware, however, require rotatably driving a drive shaft of a film transport mechanism in one direction, causing the film pull down mechanism driven thereby to project film in a "forward" direction, and reversing the direction of rotation of the drive shaft to project film in a "reverse" direction. Such projectors employ clutch mechanisms and controls therefor of varied design and complexity connected to the drive shaft to control the direction in which it is rotatably driven. Furthermore, the film pull down mechanisms per se are generally of relatively complicated construction, requirng a plurality of cams, cam followers and linkages to generate the proper motion of the film claw to provide "forward," "reverse" and "still" projection of the film.

SUMMARY OF THE INVENTION

This invention includes within its scope a film pull down mechanism for a motion picture projector in which the proper motion of the film claw to provide "forward," "reverse" and "still" projection of the film is controlled by a single unitary cam mounted for unidirectional rotation on a shaft and having a pair of cam followers cooperating therewith. The periphery of the cam and its corresponding cam follower provide the required up-and-down motion of the film claw needed for advancing or reversing the film. One side of the cam is provided with three radially spaced concentric cam surfaces, two of which cooperate with a corresponding in-and-out cam follower to provide the required in-and-out motion of the film claw relative to the perforations in the film needed for "forward" and "reverse" projection of the film. In addition, another of the radially spaced cam surfaces is designed to disable the film claw in a position disengaged from the perforations in the film for "still" projection of the film. A control means is provided for selectively moving the in-and-out cam follower into engagement with one of the three aforementioned cam surfaces.

One of the objects of the present invention is to provide a film pull down and control mechanism for a motion picture projector in which "forward," "reverse" and "still" projection can be achieved without the necessity of incorporating complicated and expensive clutch mechanisms and controls into the projector, and without the necessity of stopping and/or reversing the projector film transport mechanism.

Objects and advantages other than those set forth above will be apparent from the following description when read in connection with the accompanying drawing.

BRIEF DESCRIPTION OF THE DRAWING

FIG. 1 is a perspective view of the film pull down and control mechanism of this invention with other portions of the motion picture projector omitted for purposes of clarity;

FIG. 2 is an exploded view of the film pull down and control mechanism of FIG. 1; and FIG. 3 is a front elevation view showing only the control lever and unitary cam and cam followers, the control lever being shown in its "still" position in solid lines, and in its "forward" and "reverse" positions in broken lines.

DETAILED DESCRIPTION OF THE PREFERRED EMBODIMENT

Referring to the drawing, the improved film pull down and control mechanism of this invention is disclosed comprising a film indexing shuttle plate 6 having a bent portion at one end thereof provided with a plurality of film claws 8 designed for movement into and out of perforations in a film, not shown. The shuttle plate 6 has an opening 10 for accommodating a drive shaft 12, and is mounted for vertically oriented up-and-down movement on a pair of steel balls 14. The balls 14 are interposed between recesses 16 in shuttle plate 6, into which the balls partially extend, and a fixed V-shaped guideway 18 secured to the housing of the projector, not shown. The balls 14 provide a vertically oriented pivot about which plate 6 is pivotally movable laterally for moving claws 8 into and out of the perforations in the film. A spring 20 secured to a lug on plate 6 urges the plate and balls 14 into engagement with guideway 18, and, by virtue of its location on one side of the vertically oriented pivot, pivots plate 6 laterally as aforementioned in the direction of the spring as seen in FIG. 1.

The vertically oriented up-and-down and laterally oriented pivotal movements of shuttle plate 6 and film claws 8 are achieved by a unitary cam 22 secured to projector drive shaft 12 for rotation therewith. The shuttle plate 6 is provided with a headed pin 24 for supporting a sleeve 26 which functions as an up-and-down cam follower. The shuttle plate 6 is urged in a vertical direction by a spring 28 secured to a lug thereof, causing cam follower 26 to engage the periphery 27 of cam 22. The shape or configuration of the periphery 27 of cam 22 is designed to impart up-and-down movement to shuttle plate 6 upon rotation of the drive shaft 12 and cam 22. The face of cam 22, as best seen in FIGS. 2 and 3, is provided with three radially spaced anular cam surfaces 30, 32 and 34 of varied configurations which selectively cooperate with a cam follower 36. The cam follower 36 is interposed between the face of cam 22 and a surface of shuttle plate 6, and is selectively movable into engagement with one of the cam surfaces 30, 32, 34 to provide the desired lateral movement of plate 6 and film claws 8 to achieve "forward," "reverse" and "still" projection of the film upon up-and-down motion of the claws. The cam follower 36 is supported for axial movement in an opening 38 in a control lever 40 pivotally mounted on a stub shaft 42, and the follower is constantly urged by spring 20 and plate 6, bearing against one end of follower 36, into engagement with the face of cam 22.

In the operation of this invention, movement of control lever 40 in a position for "forward" operation of the projector, as seen in broken lines in FIG. 3, positions the in-and-out cam follower 36 in engagement with the innermost cam surface 34 by virtue of the action of spring 20. Upon rotation of drive shaft 12 and cam 22 in the direction of the arrow, as seen in FIGS. 1 and 3, the configuration of cam surfaces 27 and 34 and the angular phase relationship therebetween are such that claws 8 will engage the perforations of the film at the uppermost position of shuttle plate 6, which is then moved downwardly to advance the film through the projector. When control lever 40 is moved into the "still" projection position, shown in solid lines in FIG. 3, placing cam follower 36 on the center cam surface 32, the plate 6 is disabled in relation to in-and-out movement with claws 8 disengaged from the perforations of the film during the up-and-down movement of shuttle plate 6. Consequently, the film will remain stationary in the film gate, not shown, for single-frame projection. When control lever 40 is moved into the "reverse" projection position, shown in broken lines in FIG. 3, cam follower 36 is positioned into engagement with the outermost cam surface 30. The configuration and angular phase relationship of the cam surfaces 27 and 30 provide that film claws 8 will be moved into the perforations of the film at the lowermost position of shuttle plate 6 and will be held therein while plate 6 is moved upwardly, thereby moving the film in a "reverse" direction.

The invention has been described in detail with particular reference to the preferred embodiment thereof, but it will be understood that variations and modifications can be effected within the spirit and scope of the invention.

I claim:

1. In a film pull down mechanism for a motion picture projector having a pair of movable cam followers and film transport means responsive to movement of said pair of cam followers for transporting film in a forward or reverse direction, the improvement comprising:
    means for positioning one of said pair of cam followers selectively in each of two positions to transport the film selectively in said forward or reverse direction; and
    a unidirectionally rotatable unitary cam cooperating with and controlling the movement of said pair of cam followers in an operatively phased relationship;
    said cam having one side thereof provided with a pair of radially spaced cam surfaces of varying configuration, each such surface selectively cooperating with said one of said pair of cam followers when said one follower is in one of said two positions to transport the film selectively in a corresponding one of said forward and reverse directions;
    said cam further having a cam surface transverse to said radially spaced cam surfaces and cooperating with the other of said pair of cam followers.

2. The invention according to claim 1 wherein said positioning means for said one of said pair of cam followers comprises a movable lever, means on said lever for supporting said one of said pair of cam followers between said film transport means and said one side of said cam, a spring for urging said film transport means into engagement with one end of said one of said pair of cam followers, said one of said pair of cam followers being movable by said lever in a path generally radially of said cam to position the other end of said one of said pair of cam followers on a selected one of said pair of radially spaced cam surfaces.

3. The invention according to claim 1 wherein said cam has a third radially spaced cam surface, and said one of said pair of cam followers is movable to a third position in which said one of said pair of cam followers cooperates with said third radially spaced cam surface to disable said film transport means so that the film is not transported in either direction when said one of said pair of cam followers is in said third position.

4. In a film pull down mechanism for a motion picture projector, the combination comprising:
    a shuttle plate having a film-engaging member;
    a unidirectionally rotatable unitary cam;
    said cam having a pair of radially spaced cam surfaces on one side thereof and a cam surface transverse to said radially spaced cam surfaces;
    an up-and-down cam follower secured to said plate and cooperating with said transverse cam surface to impart up-and-down movement to said plate; and
    an in-and-out cam follower interposed between said one side of said cam and said shuttle plate and movable between a first position, in which said in-and-out cam follower cooperates with one of said pair of cam surfaces to move said member into and out of engagement with the film in an operatively phased relationship with said up-and-down movement of said plate to effect movement of the film in one direction, and a second position, in which said in-and-out cam follower cooperates with the other of said pair of cam surfaces to move said claw into and out of engagement with the film in an operatively phased relationship with said up-and-down movement of said plate to effect movement of the film in the opposite direction.

5. The invention according to claim 4 wherein said in-and-out cam follower is movable to a third position, in which said shuttle plate is disabled, with said member in a film-disengaged position, whereby the film is maintained in a still position during movement of said cam and cam followers.

6. The invention according to claim 4 further including means for moving said in-and-out cam follower between said first and second positions.

7. The invention according to claim 4 further including means for moving one end of said in-and-out cam follower substantially radially of said cam between said first and second positions, said moving means comprising a lever for supporting said in-and-out cam follower between said one side of said cam and said shuttle plate, and means for urging said shuttle plate into engagement with the other end of said in-and-out cam follower.

8. In a film pull down mechanism for a motion picture projector, the combination comprising:
    means for transporting film in forward and reverse directions, said film transporting means including film-engaging means movable into and out of engagement with the film and movable in said forward and reverse directions to transport the film selectively in said forward and reverse directions;
    a unidirectionally rotatable cam engageable with said film transporting means, said cam having at least a pair of radially spaced cam surfaces thereon; and
    an in-and-out cam follower interposed between said cam and said film transporting means and movable between a first position, in which said in-and-out cam follower cooperates with one of said pair of cam surfaces to move said film-engaging means into and out of engagement with the film in operatively phased relationship with movement of said film-engaging means in one of said forward and reverse directions to effect movement of the film in said one direction, and a second position, in which said in-and-out cam follower cooperates with the other of said pair of cam surfaces to move said film-engaging means into and out of engagement with the film in operatively phased relationship with movement of said film-engaging means in the other of said forward and reverse directions to effect movement of the film in said other direction.

References Cited

UNITED STATES PATENTS 3,152,741 10/1964 Jorgenson _____ 352—194 X
3,212,840 10/1965 Roman _____ 226—62 X M. HENSON WOOD, Jr., Primary Examiner R. A. SCHACHER, Assistant Examiner U.S. Cl. X.R.
226—62